UNITED STATES PATENT OFFICE.

WILLIAM PETERS, OF BALTIMORE, MARYLAND, ASSIGNOR TO HIMSELF AND ALFRED BUCK, OF SAME PLACE.

IMPROVEMENT IN THE MANUFACTURE OF FIRE-BRICK.

Specification forming part of Letters Patent No. 36,195, dated August 12, 1862.

*To all whom it may concern:*

Be it known that I, WILLIAM PETERS, of the city of Baltimore, in the State of Maryland, have invented a certain new and useful Improvement in Fire-Brick; and I do hereby declare the following to be a full, clear, and exact description thereof.

My improvement consists in making firebrick of a composition made up of asbestus and any of the earths, clays, mineral substances, sand, or ground or pulverized stones that may be suitable for the purpose.

In the brick which I have made I have generally used either soapstone, or clay, or sand, or kaolin; but any one of these articles may be used in connection with asbestus, or all of them may be used together. I have also used pulverized quartz and pulverized sandstone with the asbestus. As the brick can be used for various purposes—such as lining metallurgic furnaces, fire-pots, retorts for gas, &c.—sometimes one substance of the earths or of the pulverized stones will be preferred over the others, and the selection of the substance may be due to the size or form of the brick or blocks or slabs to be made, as also to the position or place where they are to be used. For lining retorts, or for making crucibles, or for lining any surfaces exposed to heat, such form will be given to the brick or slabs or plates as will best adapt them to the purpose, and, as is evident, this form can be produced by any method of molding that may be preferred.

In carrying out my invention when clays or moist substances are used with the asbestus this substance may be taken dry, either from the mill or rollers wherein it may have been ground or crushed, or it may be used in its crude state; and the asbestus and clay or earth, being placed in suitable molds, can, by hydraulic or other pressure, be compressed into the desired form. When the substance to be united with the asbestus is dry, both may be subjected to water or any other desirable fluid, and a layer of asbestus and a layer or stratum of the substance alternate until the quantity desired is made up; or any other plan may be adopted by which the materials will become sufficiently commingled or mixed up with each other. In most cases pressure alone will be needed to give form to the brick or slabs; but there may be uses to which they may be put where such material will be used in combination with the asbestus, as will require heat also to produce the desired article.

I am aware that in the manufacture of crucibles, brick, &c., from fire-clay it has been proposed to use a limited percentage of asbestus with the view of giving the materials consistency; but, as will readily be seen, this proposition is not within the scope or objects of my invention.

What I claim as my invention, and desire to secure by Letters Patent, is—

Making fire-brick of asbestus and other material, substantially as herein set forth.

This specification signed this 11th day of April, 1862.

WM. PETERS.

Witnesses:
    THOS. T. EVERETT,
    JOSEPH ELLICOTT.